(12) United States Patent
Kawamura et al.

(10) Patent No.: US 8,825,893 B2
(45) Date of Patent: Sep. 2, 2014

(54) RELAY DEVICE, RELAY METHOD AND RELAY SYSTEM

(75) Inventors: Takuya Kawamura, Kanagawa-ken (JP); Narumichi Sakai, Kanagawa-ken (JP); Shigeo Matsuzawa, Tokyo (JP); Masataka Goto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 128 days.

(21) Appl. No.: 13/316,664

(22) Filed: Dec. 12, 2011

(65) Prior Publication Data

US 2012/0084457 A1 Apr. 5, 2012

Related U.S. Application Data

(63) Continuation of application No. PCT/JP2009/004712, filed on Sep. 18, 2009.

(51) Int. Cl.
*G06F 15/16* (2006.01)
*G06F 3/14* (2006.01)

(52) U.S. Cl.
CPC ................... *G06F 3/1415* (2013.01)
USPC .......................... 709/234; 709/200

(58) Field of Classification Search
USPC ................................. 709/200, 234
See application file for complete search history.

(56) References Cited

U.S. PATENT DOCUMENTS

| | | | |
|---|---|---|---|
| 5,779,634 A * | 7/1998 | Ema et al. ...................... 600/407 |
| 6,377,271 B1 * | 4/2002 | Muta et al. ..................... 345/600 |
| 7,028,096 B1 * | 4/2006 | Lee ............................... 709/231 |
| 7,058,691 B1 * | 6/2006 | Yu et al. ......................... 709/207 |
| 7,349,902 B1 * | 3/2008 | Arlitt et al. ............................. 1/1 |
| 7,369,661 B2 * | 5/2008 | Graunke ........................ 380/260 |
| 7,464,381 B1 * | 12/2008 | Nickerson et al. ............. 719/311 |
| 7,603,616 B2 * | 10/2009 | Obata et al. .................... 715/205 |
| 8,160,296 B2 * | 4/2012 | O'Hara et al. ................. 382/103 |
| 2006/0064500 A1 * | 3/2006 | Roth et al. ..................... 709/231 |
| 2007/0239874 A1 * | 10/2007 | Lazaridis et al. .............. 709/226 |
| 2007/0260984 A1 * | 11/2007 | Marks et al. ................... 715/706 |
| 2007/0277102 A1 * | 11/2007 | Kanzaki ......................... 715/540 |
| 2008/0095151 A1 | 4/2008 | Kawazoe et al. |
| 2008/0195316 A1 * | 8/2008 | Krishnaswamy ............. 701/213 |
| 2010/0073505 A1 * | 3/2010 | Kondo et al. ............... 348/222.1 |
| 2010/0318599 A1 * | 12/2010 | Yun et al. ....................... 709/203 |
| 2010/0322523 A1 * | 12/2010 | Mitsuhashi et al. .......... 382/218 |
| 2011/0055774 A1 * | 3/2011 | Kim et al. ...................... 715/863 |

(Continued)

OTHER PUBLICATIONS

Aksoy, Cumhur, et al., "Optimising Thin Clients for Wireless Active-media Applications", Computer & Information Science & Eng. Department, University of Florida, Gainsville, Florida. http://www.harris.cise.ufl.edu/projects/wirelessTC.

(Continued)

*Primary Examiner* — Anthony Mejia
(74) *Attorney, Agent, or Firm* — Amin, Turocy & Watson, LLP

(57) ABSTRACT

A relay device includes a screen information receiving unit that receives screen information from the application server, a cycle screen storage unit that stores screen information, a cycle detecting unit that detects a cycle of a change as first cycle information when the screen information cyclically changes, a cycle converting unit that converts the first cycle information into second cycle information, and a screen, information transmitting unit that acquires screen information from the cycle screen storage unit and transmits the screen information to the client terminal at a timing based on the second cycle information.

15 Claims, 12 Drawing Sheets

(56) References Cited

U.S. PATENT DOCUMENTS

2012/0084457 A1* 4/2012 Kawamura et al. ........... 709/234
2013/0117413 A1* 5/2013 Kaneko et al. ................ 709/217
2013/0144986 A1* 6/2013 Yamada et al. ............... 709/219

OTHER PUBLICATIONS

International Search Report for International Application No. PCT/JP2009/004712 mailed on Mar. 9, 2010.

* cited by examiner

| ID | REGION INFORMATION | PIXEL INFORMATION | RECEPTION TIME |
|---|---|---|---|
| 1 | (x11, y11) ~ (x12, y12) | POINTER TO PIXEL INFORMATION A | t1,t4,t7,t10,t13,··· |
| 2 | (x21, y21) ~ (x22, y22) | POINTER TO PIXEL INFORMATION a | t1,t5,t9,t13, ··· |
| 3 | (x11, y11) ~ (x12, y12) | POINTER TO PIXEL INFORMATION B | t2,t5,t8,t11,t14,··· |
| 4 | (x11, y11) ~ (x12, y12) | POINTER TO PIXEL INFORMATION C | t3,t6,t9,t12,t15,··· |
| 5 | (x21, y21) ~ (x22, y22) | POINTER TO PIXEL INFORMATION b | t3,t7,t11,t15, ··· |
|  |  |  |  |
|  |  |  |  |

| ID | CYCLE TIME |
|---|---|
| 1 | T_ID1 |
| 2 | T_ID2 |
| 3 | T_ID3 |
| 4 | T_ID4 |
| 5 | T_ID5 |
| | |

FIG. 8A

| ID | CYCLE TIME |
|---|---|
| 1 | ((t4-t1)+(t7-t4)+(t10-t7))/3 |
| 2 | ((t5-t1)+(t9-t5)+(t13-t9))/3 |
| 3 | ((t5-t2)+(t8-t5)+(t11-t8))/3 |
| 4 | ((t6-t3)+(t9-t6)+(t12-t9))/3 |
| 5 | ((t7-t3)+(t11-t7)+(t15-t11))/3 |
| | |

FIG. 8B

| ID | REGION INFORMATION | PIXEL INFORMATION | RECEPTION TIME | CYCLE TIME |
|---|---|---|---|---|
| 1 | (x11, y11) ~ (x12, y12) | POINTER TO PIXEL INFORMATION A | t_A1, t_A2, t_A3, …, t_Am, t_Am+1 | $T\_A1 = \sum_{k=1}^{m}(t\_A(k+1) - t\_Ak)/m$ |
| 2 | (x11, y11) ~ (x12, y12) | POINTER TO PIXEL INFORMATION B | t_B1, t_B2, t_B3, …, t_Bm, t_Bm+1 | $T\_B1 = \sum_{k=1}^{m}(t\_B(k+1) - t\_Bk)/m$ |
|  |  |  |  |  |

| ID | ADJUSTED CYCLE TIME |
|---|---|
| 1 | AT_ID1 |
| 2 | AT_ID2 |
| 3 | AT_ID3 |
| 4 | AT_ID4 |
| 5 | AT_ID5 |
|  |  |

| ID | REGION INFORMATION | PIXEL INFORMATION | RECEPTION TIME | CYCLE TIME |
|---|---|---|---|---|
| 1 | (x11, y11) ~(x12, y12) | POINTER TO PIXEL INFORMATION A | t_A1, t_A2, t_A3 | $T\_A = \sum_{k-1}^{2}(t\_A(k+1)-t\_Ak)/2$ |
| 2 | (x11, y11) ~(x12, y12) | POINTER TO PIXEL INFORMATION B | t_B1, t_B2, t_B3 | $T\_B = \sum_{k-1}^{2}(t\_B(k+1)-t\_Bk)/2$ |
| 3 | (x11, y11) ~(x12, y12) | POINTER TO PIXEL INFORMATION C | t_C1, t_C2, t_C3 | $T\_C = \sum_{k-1}^{2}(t\_C(k+1)-t\_Ck)/2$ |
| | | | | |

| New ID | ID | RECEPTION START TIME | ADJUSTED CYCLE TIME | OFFSET TIME |
|---|---|---|---|---|
| 100 | 1 | t_A1 | t_A | t_A1- t_A1 |
| 101 | 2 | t_B1 | t_A | t_B1- t_B1 |
| 102 | 3 | t_C1 | t_A | t_C1- t_C1 |
| | | | | |
| | | | | |

FIG. 12A

| New ID | ID | RECEPTION START TIME | ADJUSTED CYCLE TIME | OFFSET TIME |
|---|---|---|---|---|
| 100 | 1 | t_1 | ((t4-t1)+(t7-t4)+(t10-t7))/3 | t_1- t_1 |
| 101 | 2 | t_2 | ((t4-t1)+(t7-t4)+(t10-t7))/3 | t_2- t_1 |
| 102 | 3 | t_3 | ((t4-t1)+(t7-t4)+(t10-t7))/3 | t_3- t_1 |
| 200 | 4 | t_1 | ((t5-t1)+(t9-t5)+(t13-t9))/3 | t_1- t_1 |
| 201 | 5 | t_3 | ((t5-t1)+(t9-t5)+(t13-t9))/3 | t_3- t_1 |
| | | | | |
| | | | | |

FIG. 12B

RELAY DEVICE, RELAY METHOD AND RELAY SYSTEM

CROSS-REFERENCE TO RELATED APPLICATIONS

This application is a continuation application of PCT application Serial No. PCT/JP2009/004712, filed on Sep. 18, 2009, the entire contents of which are incorporated herein by reference.

FIELD

Embodiments described herein generally relate to a relay device, a relay method and a relay system.

BACKGROUND

In a system that transfers a screen from an application server to a client terminal, mismatch occurs in an arrival time of screen data in the client terminal, due to a process load amount of the application server or the client terminal, a network state, etc. Therefore, when the same screen appears cyclically (display of flickers, for example), it sometimes occurs that a screen that is regularly and cyclically displayed in the application server is not cyclically displayed in the client terminal.

As a technique to solve this problem, a system is invented in which an application server suspends transfer of a screen to a client terminal when the system detects cyclical appearance of the same screen, and the client terminal cyclically displays a stored screen.

BRIEF DESCRIPTION OF THE DRAWINGS

FIG. 8A is a diagram showing an example of a reception cycle time table according to the first embodiment;

FIG. 8B is a diagram showing an example of a reception cycle time table according to the first embodiment;

FIG. 12A is a diagram showing an example of an adjusted cycle time table according to the second embodiment; and FIG. 12B is a diagram showing an example of an adjusted cycle time table according to the second embodiment.

DETAILED DESCRIPTION

In view of the above circumstances, an aspect of the embodiments provides a relay device that relays communications between a server which transmits screen information and a client which receives the screen information. The relay device includes a receiving unit that receives the screen information from the server, a storage unit that stores the screen information, a detecting unit that detects a cycle of a change as first cycle information when the screen information cyclically changes, a converting unit that converts the first cycle information into second cycle information, and a transmitting unit that acquires the screen information from the storage unit and transmits the screen information to the client, at a timing based on the second cycle information.

According to the aspect of the embodiments, a relay device can cyclically display a screen in a client terminal, even when the application server and the client terminal do not have a special function to cyclically display a screen.

Embodiments of the invention are explained in detail below with reference to drawings.

First Embodiment

Figure 1A:
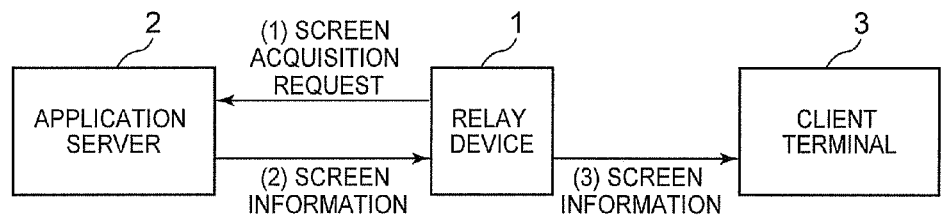
FIG. 1A is a diagram showing a screen transfer system according to a first embodiment of the invention.

FIG. 1A shows a screen transfer system to which a relay device according to a first embodiment of the invention is applied. The screen transfer system has a relay device 1, an application server 2, and a client terminal 3 connected to each other by a network connection.

In this case, the network connection means a LAN connection or an Internet connection.

An application is started in the application server 2. In the embodiment, a screen transmission function is built in the application server 2. The application server 2 generates screen data and transmits the screen data to the relay device 1 via a network. In the embodiment, a pull-type screen transfer protocol is used to transmit/receive screen data between the application server 2 and the relay device 1. RFB (Remote Frame Buffer) protocol is available as an example of the pull-type screen transfer protocol. VNC (Virtual Network Computing) is available as a screen transfer system that uses this RFB protocol.

In the RFB protocol, when a screen receiving side (the relay device 1, in this example) transmits a screen data acquisition request (Frame Buffer Update Request) to a screen transmitting side (the application server 2, in this example), the screen transmitting side responds screen data as Frame Buffer Update to the screen receiving side. Because the application server 2 transmits the screen data by using the RFB protocol of VNC, the application server 2 starts "VNC server" software.

The relay device 1 receives the screen data from the application server 2, performs a process such as decoding to the received screen data, and transmits processed screen data to the client terminal 3. Because the relay device 1 receives the screen data from the application server 2 by using the RFB protocol of VNC, the relay device 1 starts "VNC client" software.

On the other hand, a push-type screen transfer protocol is used in the embodiment to transmit/receive screen data between the relay device 1 and the client terminal 3. In the push-type screen transfer protocol, a screen transmitting side (the relay device 1, in this example) unilaterally transmits screen information to a screen receiving side (the client terminal 3, in this example), without requiring a screen data acquisition request from the screen receiving side. A network display (ND) protocol is available as an example of the push-type screen transfer protocol. In the ND protocol, a machine that starts the "ND server" software can transmit screen data by the push-type to a machine that starts the "ND client" software. Because the relay device 1 transmits screen data by using the ND protocol, the relay device 1 starts the "ND server" software.

The client terminal 3 receives the screen data from the relay device 1. The client terminal 3 generates a screen to be displayed from the received screen data and displays the screen in a display unit (not shown). Because the client terminal 3 receives the screen data from the application server 2 by using the ND protocol, the client terminal 3 starts the "ND client" software.

As described above, in the screen transfer system shown in FIG. 1A, a screen generated by the application in the application server 2 is processed by the relay device 1, and thereafter, is displayed in the display unit of the client terminal 3.

In the embodiment, the application of the application server 2 generates a screen in which the whole screen, or a part or plural parts of the screen change cyclically and regularly. The screen that changes cyclically and regularly means a screen on which the same content is cyclically expressed at the same position. For example, an alarm lamp is displayed on the screen, and this alarm lamp flickers at a constant time interval.

Figure 2A:
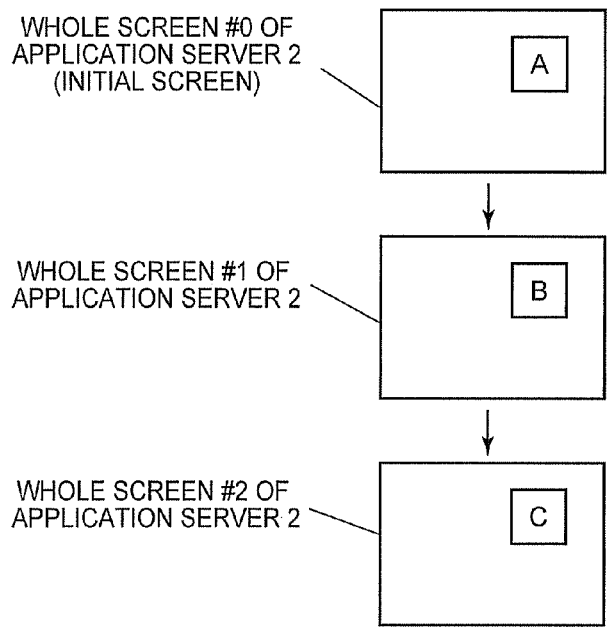
FIG. 2A is a diagram showing a time change of a screen generated by an application server 2 according to the first embodiment.

FIG. 2A shows a time change of a screen generated by the application server 2. In FIG. 2A, a part of the screen changes as A, B, C, together with elapse of time. A portion of A, B, C is an alarm lamp, for example, and the alarm lamp changes as A (green color)→B (yellow color)→C (red color). Although the alarm lamp changes in three patterns of "A B→C→A→B→C→A→" in this example, the change can be in two patterns of A (green color)→C (red color), or in four patterns of A (green color)→B (yellow color)→C (red color) →D (blue color).

Figure 2B:
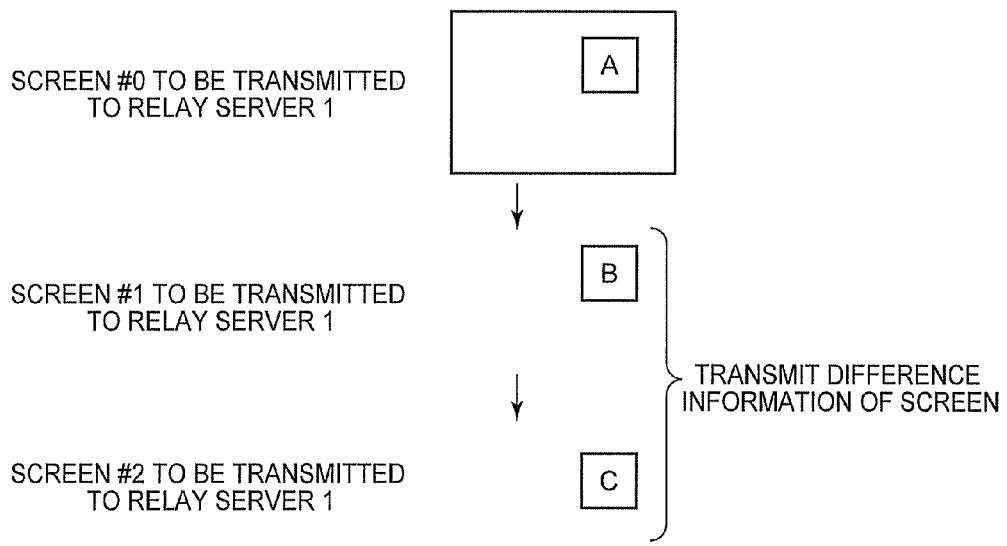
FIG. 2B is a diagram showing screen information that the application server 2 transmits to the relay device 1 according to the first embodiment.

FIG. 2B shows a time change of a screen transmitted from the application server 2 to the relay device 1. The application server 2 can be arranged to transmit only a difference of screen information to the relay device 1 as shown in FIG. 2B, instead of transmitting whole screen information to the relay device 1 each time when A, B, C is transmitted as shown in FIG. 2A.

Figure 1B:
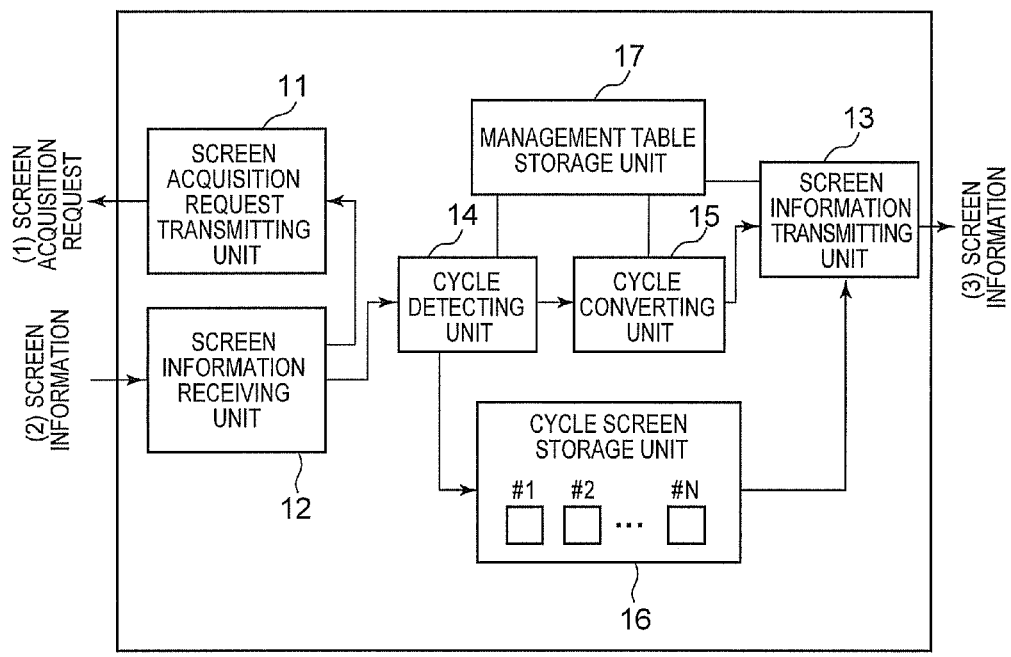
FIG. 1B is a block diagram showing a configuration of a relay device 1 according to the first embodiment.

FIG. 1B is a block diagram showing a configuration of the relay device 1 according to the embodiment. The relay device 1 includes a screen acquisition request transmitting unit 11, a screen information receiving unit 12, a screen information transmitting unit 13, a cycle detecting unit 14, a cycle converting unit 15, a cycle screen storage unit 16, and a management table storage unit 17.

The screen acquisition request transmitting unit 11 transmits a screen acquisition request to the application server 2. The screen acquisition request is transmitted periodically. Alternatively, the screen acquisition request is transmitted when a reception completion notice is input from the information receiving unit 12.

The screen information receiving unit 12 receives screen information from the application server 2. When the screen information is compressed, the screen information receiving unit 12 expands the screen information, and outputs the expanded screen information to the cycle detecting unit 14. The screen information receiving unit 12 outputs the reception completion notice to the screen acquisition request transmitting unit 11. In the embodiment, the screen acquisition request transmitting unit 11 and the screen information receiving unit 12 correspond to functions of the VNC client.

The cycle detecting unit 14 writes screen information into a frame buffer (not shown), upon receiving the screen information from the screen information receiving unit 12. The cycle detecting unit 14 detects whether there is update of the screen information written in the frame buffer from screen information received last time. When there is update of the screen information, the cycle detecting unit 14 records reception time of the screen information together with region information that indicates a position of an updated portion, into the management table storage unit 17. Pixel information of the updated portion (a part of the screen information) is stored in the cycle screen storage unit 16.

Further, the cycle detecting unit 14 calculates a cycle time of updating the updated portion from the region information and the reception time that are recorded. The cycle time is defined as a time length of a reception interval of the same pixel information of the same updated portion that is repeatedly received. These functions held by the cycle detecting unit 14 are described in detail later.

The cycle converting unit 15 has a function to adjust a cycle time calculated by the cycle detecting unit 14. That is, the cycle converting unit 15 converts the cycle time calculated by the cycle detecting unit 14 into a separate cycle time. The cycle converting unit 15 also notifies presence of a screen that cyclically changes (hereinafter, "cycle screen"), to the screen information transmitting unit 13. These functions held by the cycle converting unit 15 are also described in detail later.

The cycle screen storage unit 16 stores pixel information of an updated portion detected by the cycle detecting unit 14. The management table storage unit 17 stores various management tables described later.

The screen information transmitting unit 13 transmits screen information written in the frame buffer in an initial state to the client terminal 3. On the other hand, after the cycle converting unit 15 notifies presence of a cycle screen to the screen information transmitting unit 13, the screen information transmitting unit 13 acquires corresponding pixel information at this timing from the cycle screen storage unit 16 by using the cycle time adjusted by the cycle converting unit 15. The screen information transmitting unit 13 transmits the acquired pixel information to the client terminal 3 as screen information.

In the embodiment, the screen information transmitting unit 13 corresponds to functions of the ND server. When the ND server of the relay device 1 transmits screen information of a difference to the client terminal 3 by using the ND protocol, the "ND client" software generates a screen by combining the received difference information with already known screen information, and draws the screen.

Operations of the cycle detecting unit 14, the cycle converting unit 15, and the screen information transmitting unit 13 are explained in detail below. Consider a case where, in FIG. 1B, screen information output from the screen information receiving unit 12 is written into a frame buffer (not shown), and the screen information transmitting unit 13 transmits screen information written in the frame buffer to the client terminal 3.

Figure 3:
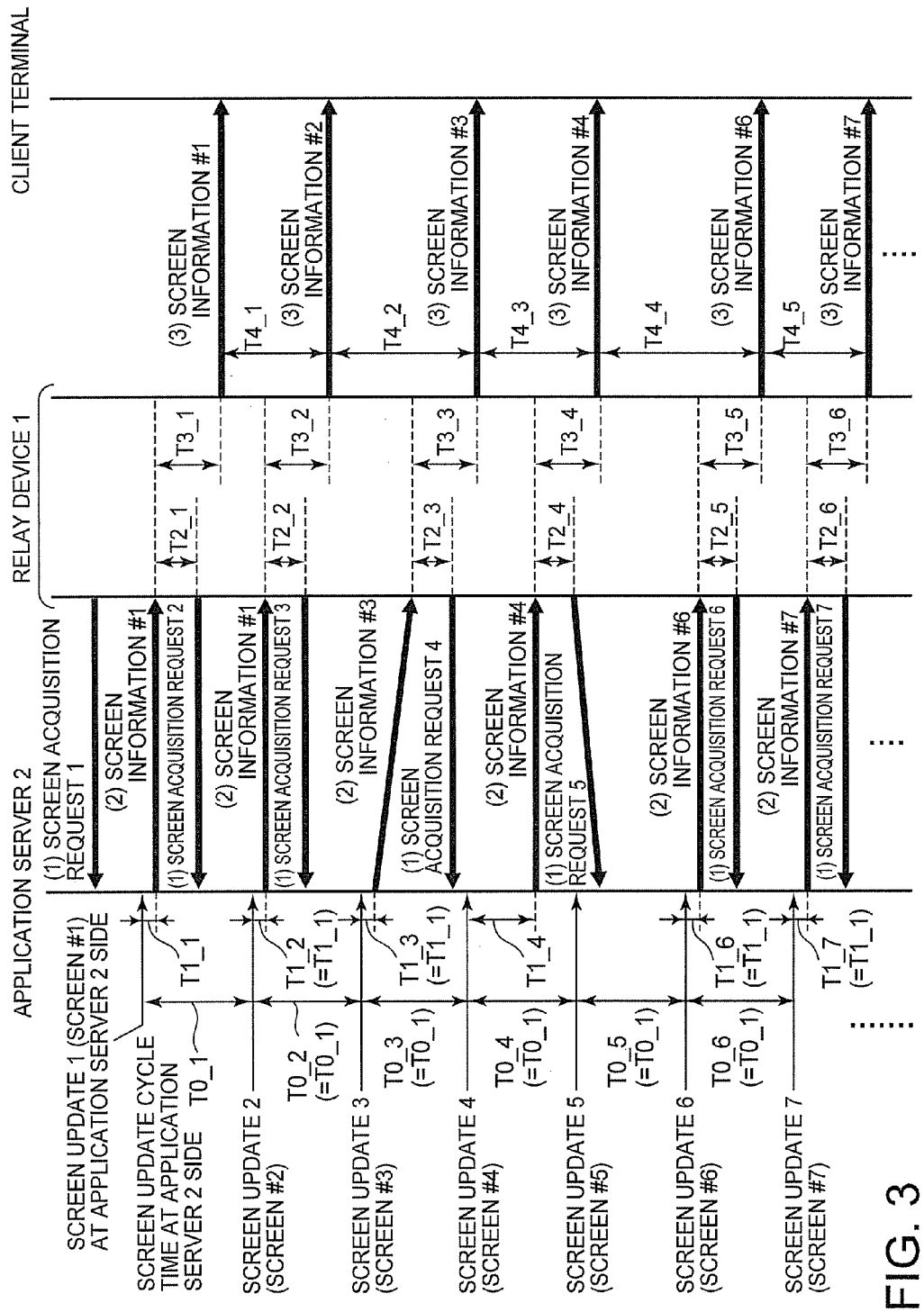
FIG. 3 shows an example of a screen transfer sequence when the screen transfer system is in an initial state according to the first embodiment.

FIG. 3 shows a signal sequence of screen transfer in an initial state in the screen transfer system in FIG. 1A. In FIG. 3, the application that operates in the application server 2 is generating a cycle screen. The application server 2 sequentially generates a screen, by generating a screen #1 first, generating a screen #2 after T0_1 seconds, and by further generating a screen #3 after T0_2 second, and the like. When T0_N (N>1) are all equal to T0_1, the screens are generated cyclically and regularly. For example, an alarm lamp is displayed on the screen, and this alarm lamp changes regularly and sequentially in the order of green color, yellow color, and red color.

However, even when the application server 2 is generating a cycle screen, there is a possibility that a cycle becomes very irregular at the time when the relay device 1 receives screen information from the application server 2 and transmits the received screen information to the client terminal 3.

For example, in FIG. 3, after the application server 2 first receives a screen acquisition request 1 from the relay device 1, the application server 2 transmits screen information #1 to the relay device 1 in T1_1 seconds after the application server 2 detects screen update to the screen #1. The relay device 1 transmits a next screen acquisition request 2 to the application server 2 in T2_1 seconds after receiving the screen information #1, and transmits the screen information #1 to the client terminal 3 in T3_1 seconds.

After the application server 2 receives the screen acquisition request 2 from the relay device 1, the application server 2 transmits screen information #2 to the relay device 1 in T1_2 seconds after the application server 2 detects screen update to the screen #2. The relay device 1 transmits the next screen acquisition request 2 to the application server 2 in T2_2 seconds after receiving the screen information #2, and transmits the screen information #2 to the client terminal 3 in T3_2 seconds.

In these processes, when transmission/reception times of screen information and the like via the network are all equal and also when internal process times are all equal, a time interval T4_1 between the screen information #1 and the screen information #2 transmitted from the relay device 1 to the client terminal 3 can be expected to be equal to a time interval T0_1 between the screen #1 and the screen #2 in the application server 2. As a result, the relay device 1 can transmit screen information cyclically and regularly to the client terminal 3. That the transmission/reception times of screen information and the like are all equal means that the transmission time of the screen acquisition request 1 is equal to the transmission time of the screen information acquisition request 2 and that the transmission time of the screen information #1 is equal to the transmission time of the screen information #2. That the internal process times are all equal means that T1_1=T1_2, T2_1=T2_2, and T3_1=T3_2, for example.

However, as shown in FIG. 3, there sometimes occur a delay of transfer time of screen information #3, a delay of transfer time of a screen acquisition request 5, and omission of screen information #5 following this delay. In this case, even when the internal process times are all equal, time intervals T4_2, T4_3, T4_4, etc. of screen information transmitted from the relay device 1 to the client terminal 3 become different from the time interval T0_1 of screen update by the application server 2.

If omission of the screen information #5 occurs, a screen of yellow color (screen information #5) is not transmitted from the relay device 1 to the client terminal 3 in the above example, when the screen color change in the order of green color (screen information #1, #4), yellow color (screen information #2, #5), and red color (screen information #3, #6).

According to the relay device 1 in the embodiment, to solve the above problem, the cycle detecting unit 14, the cycle converting unit 15, and the screen information transmitting unit 13 perform processes to cyclically and regularly transmit screen information to the client terminal 3. The cycle detecting unit 14, the cycle converting unit 15, and the screen information transmitting unit 13 are explained in detail below.

[Cycle Detecting Unit 14]

The cycle detecting unit 14 is explained first. The cycle detecting unit 14 has a cycle detection function and a cycle calculation function. The cycle detection function is a process of detecting a cycle screen from screen information received by the cycle detecting unit 14, and generating a cycle information table. On the other hand, the cycle calculation function is a process of calculating a reception cycle (hereinafter, "reception cycle time") of the same screen and generating a reception cycle time table based on the cycle information table generated by the cycle detection function.

<Cycle Detection Function>

Figure 4:
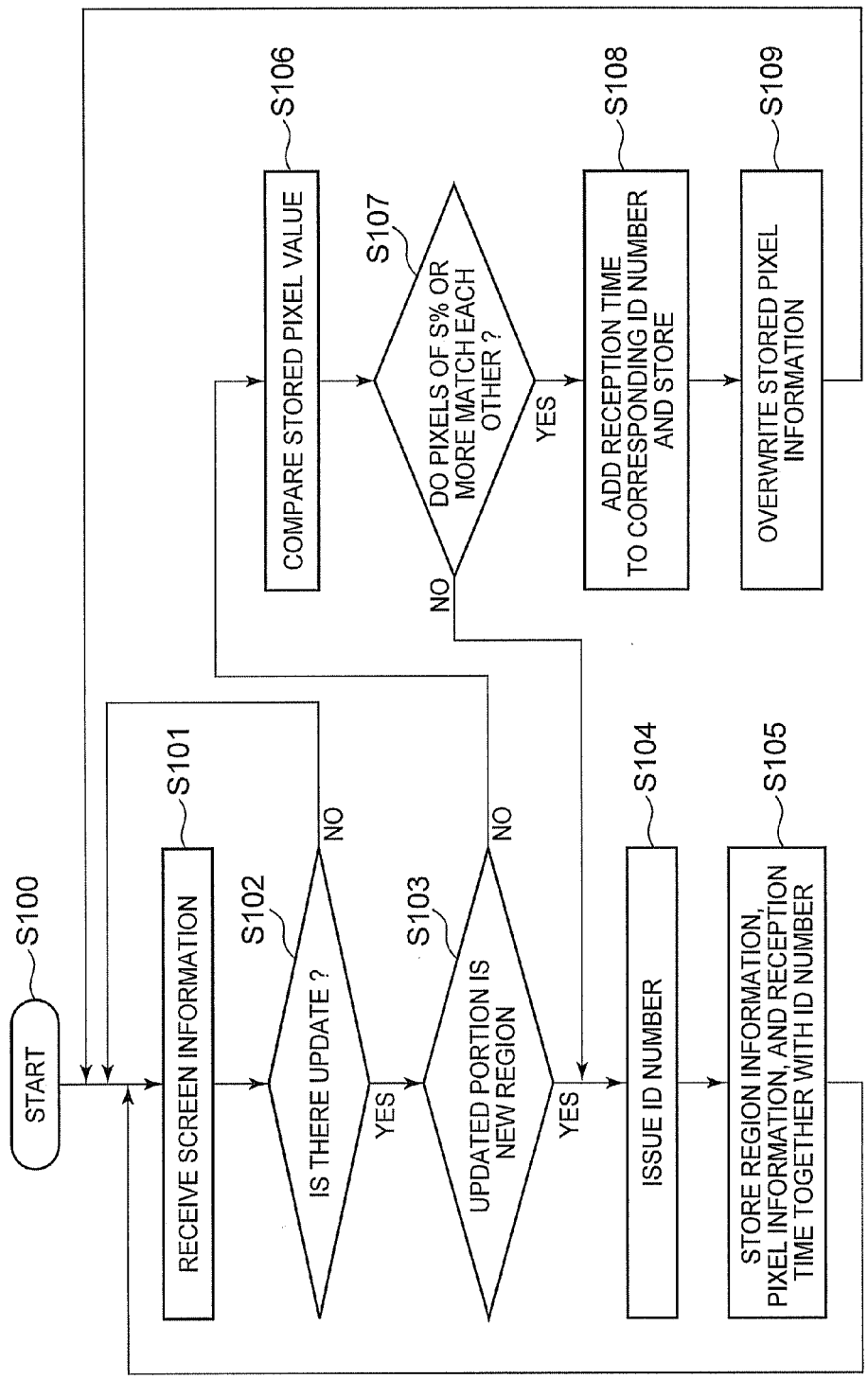
FIG. 4 is a flowchart of an internal process concerning a cycle detection function of a cycle detecting unit 14 according to the first embodiment.

The cycle detection function is explained first. FIG. 4 is a flowchart of an internal process concerning the cycle detection function of the cycle detecting unit 14. The cycle detecting unit 14 receives screen information from the screen information receiving unit 12 (Step S101), and confirms whether there is update of the screen information from the screen information received last time (Step S102).

As shown in FIG. 2A, when the application server 2 transmits screen information of a whole screen instead of a difference of screen information, the cycle detecting unit 14 determines whether update is present, by comparing a pixel value of the screen information received last time with a pixel value of the screen information received this time. In the process of comparing the pixel values, the cycle detecting unit 14 specifies a position of an updated portion. On the other hand, when the application server 2 transmits only a difference of screen information as the screen information as shown in FIG. 2B, the cycle detecting unit 14 determines whether update is present based on the difference.

When update is present in the screen information (Yes in Step S102), the cycle detecting unit 14 determines whether a region of the updated portion is a new region based on region information indicating a position of the updated portion. When the region of the updated portion is a new region (Yes in Step S103), the cycle detecting unit 14 issues an ID number (Step S104), and stores region information, reception time, and pixel information of the updated portion, together with the ID number, as a cycle information table described later, into the management table storage unit 17 (Step S105).

On the other hand, when the region of the updated portion is not a new region (No in Step S103), the cycle detecting unit 14 compares pixel values between pixel information of the updated portion with pixel information of the same region stored in the cycle screen storage unit 16 (Step S106). When pixels equal to or more than a predetermined threshold value S % match each other as a result, the cycle detecting unit 14 determines that both screens are the same. On the other hand, when pixels less than S % match each other, the cycle detecting unit 14 determines that the screen information received this time is a new screen. For example, the threshold value S is set to 95%.

When the cycle detecting unit 14 determines that both screens are the same (Yes in Step S107), the pixel information received this time is already registered last time in the cycle information table. Therefore, the cycle detecting unit 14 adds reception time of this time to various information of corresponding ID numbers and stores the added result (Step S108). The cycle detecting unit 14 overwrites the pixel information with the pixel information received this time (Step S109) Thereafter, the cycle detecting unit 14 returns to Step S101, and processes the next image information.

On the other hand, when the cycle detecting unit 14 determines that the screens are different from each other (No in Step S107), the cycle detecting unit 14 issues a new ID number (Step S104). The cycle detecting unit 14 stores region information, reception time, and pixel information of the updated portion, together with the ID number, into the cycle information table of the management table storage unit 17 (Step S105). Thereafter, the cycle detecting unit 14 returns to Step S101, and processes the next image information.

Figures 5A, 5B:
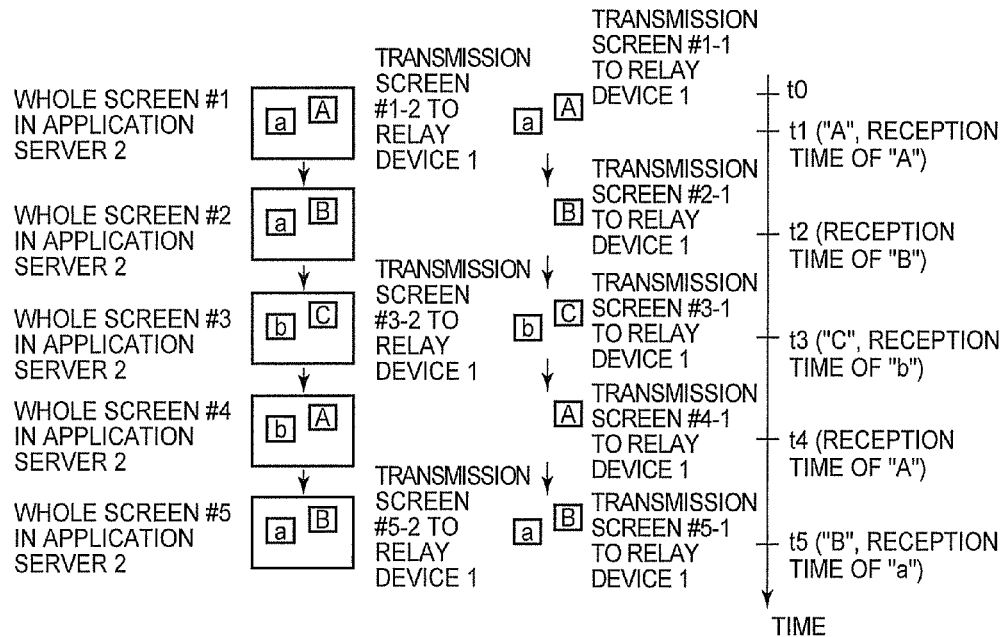
FIG. 5A is a diagram showing in time series a screen generated by the application server 2, an updated portion detected by the relay device 1, and reception time according to the first embodiment.
FIG. 5B is a diagram showing an example of a cycle information table according to the first embodiment.

Operations of generation and updating of the cycle information table by the cycle detecting unit 14 are explained next with reference to FIGS. 5A, 5B, 6A, 6B. FIG. 5A shows in time series screen information generated by the application server 2 and a change of an updated portion detected by the relay device 1. FIG. 5B shows an example of the cycle information table generated by the cycle detecting unit 14 in FIG. 5A.

As shown in FIG. 5A, when the relay device 1 receives two updated portions "A" and "a" at a time t1, the cycle detecting unit 14 of the relay device 1 issues new ID numbers ("1" and "2") in the process in Step S104, when the relay device 1 receives "A" and "a" for the first time.

As shown in the cycle information table in FIG. 5B, region information of an updated portion is expressed by coordinates, for example. The cycle detecting unit 14 acquires positions of the updated portions "A" and "a" by coordinates shown in FIG. 6A, for example. FIG. 5B shows positions of regions as (x11, y11) to (x12, y12), (x21, y21) to (x22, y22) by using right upper and left lower coordinates of the updated portions "A" and "a".

Figure 6A:
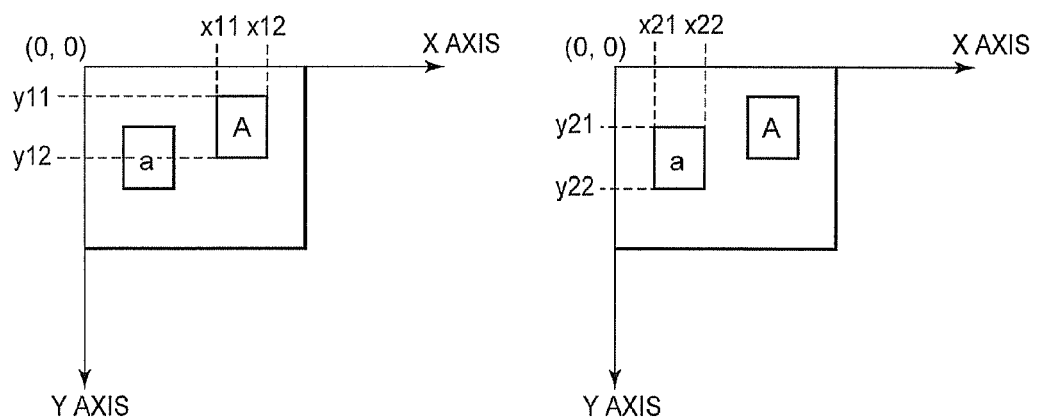
FIG. 6A is a diagram showing an example of coordinates of an updated portion on a screen according to the first embodiment.
Figure 6B:
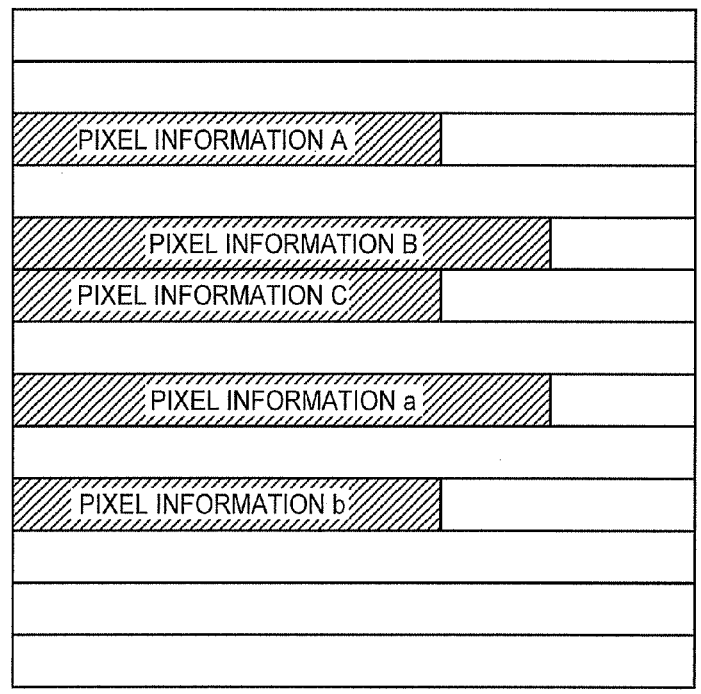
FIG. 6B is a diagram showing an example of a memory that stores pixel information of an updated portion on a screen according to the first embodiment.

FIG. 6B also shows an image of the cycle screen storage unit 16 that stores pixel information of the updated portions. Pixel information of the updated portions "A" and "a" is stored in the cycle screen storage unit 16 separately from the cycle information table as shown in FIG. 6B.

As shown in FIG. 5B, region information ((x11, y11) to (x12, y12)) of the updated portion "A", pixel information (a pointer to the pixel information A stored in the cycle screen storage unit 16), and reception time (t1) are recorded in a row of the new ID number "1" in the cycle information table. In this case, pixel information to be stored in the cycle information table is not pixel information itself but is an address of a memory that stores this pixel information. Similarly, region information ((x21, y21) to (x22, y22)) of the updated portion "a", pixel information (a pointer to the pixel information a stored in the cycle screen storage unit 16), and reception time (t1) are recorded in a row of the new ID number "2" in the cycle information table.

Next, as shown in FIG. 5A, the relay device 1 receives an updated portion "B" at a time t2. A region of the updated portion "B" is the same as that of the updated portion "A", but has a different pixel value of the pixel information. Therefore, the cycle detecting unit 14 of the relay device 1 determines that the updated portion "B" is a new updated portion, and issues a new ID number ("3"). As shown in FIG. 5B, region information ((x11, y11) to (x12, y12)) of the updated portion "B", pixel information (a pointer to the pixel information B stored in the cycle screen storage unit 16), and reception time (t2) are stored in a row of the new ID number "3" in the cycle information table. Thereafter, a similar process is performed to updated portions "b" and "C" in FIG. 5A.

Next, as shown in FIG. 5A, the relay device 1 receives the updated portion "A" at a time t4 at a second time. In this case, because the updated portion "A" is received in the past, this portion is already stored in the cycle information table. The cycle detecting unit 14 of the relay device 1 adds a reception time (t4) to the row of the ID number "1", and sets reception time (t, t4) as shown in FIG. 5B. The cycle detecting unit 14 overwrites the pixel information A of the cycle screen storage unit 16 shown in FIG. 6B with the updated portion "A".

The cycle detecting unit 14 of the relay device 1 generates the cycle information table as shown in FIG. 5B, in the manner described above.

<Cycle Calculation Function>

Figure 7:
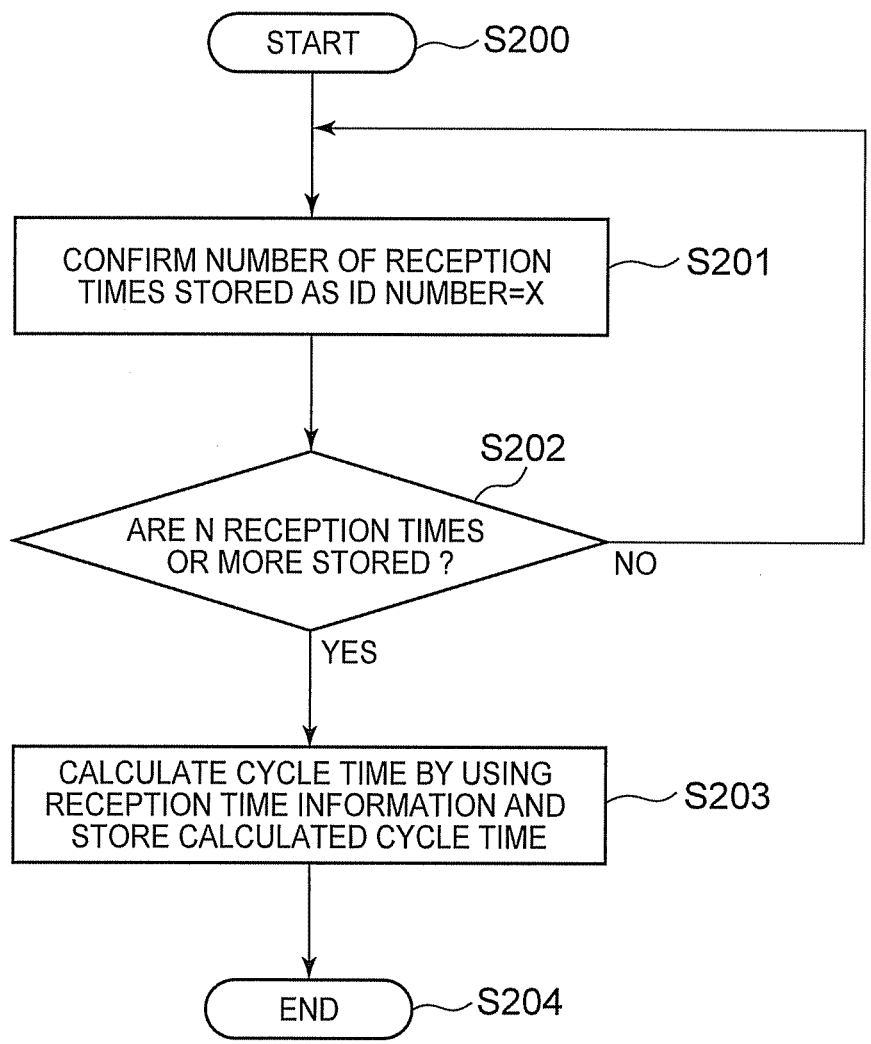
FIG. 7 is a flowchart of an internal process concerning a cycle calculation function of the cycle detecting unit 14 according to the first embodiment.

The cycle calculation function of the cycle detecting unit 14 is explained next. FIG. 7 shows a flow of an internal process of the cycle calculation function of the cycle detecting unit 14. The cycle detecting unit 14 performs the following process to each piece of information managed by an ID number, when plural pieces of information are registered in the cycle information table.

First, the cycle detecting unit 14 confirms a number of reception times stored as information of ID=X (Step S201). When the number of stored reception times is equal to or more than N (Yes in Step S202), the cycle detecting unit 14 calculates a cycle time from these reception times. N is a predetermined threshold value. The cycle detecting unit 14 stores the cycle time into the reception cycle time table (Step S203), and finishes the process. On the other hand, when the number of stored reception times is less than N (No in Step S202), the cycle detecting unit 14 returns to Step S201, and repeats the confirmation process (Step S201) until the number reception times becomes equal to or more than N.

In repeating the confirmation process of a number of reception times, the cycle detecting unit 14 determines that screens are not cycle screens when there is no change in the number of reception times, after repeating the confirmation process at a constant time interval such as every one second and after repeating the process for more than ten seconds, for example. The cycle detecting unit 14 deletes entry information of ID=X from the cycle information table, and also deletes pixel information corresponding to ID=X from the cycle screen storage unit 16.

FIG. 8A shows an example of a reception cycle time table. The cycle detecting unit 14 generates a reception cycle time table in the management table storage unit 17, and stores ID numbers and calculated cycle times (T_ID1, T_ID2, etc.).

FIG. 8B shows other example of a reception cycle time table. In FIG. 8B, a value of N in Step S201 shown in FIG. 7 is set as four, and an average value of reception time intervals is calculated by using the four reception times. For example, in the cycle information table in FIG. 5B, the four reception times are t1, t4, t7, t11 for the updated portion of ID=1. Therefore, reception time intervals become (t4−t1), (t7−t4), (t11−t7). An average value of these three time intervals is calculated as T_ID={(t4−t1)+(t7−t4)+(t11−t7)}/3. A calculation method of a cycle time is not limited to the calculation of an average value, and can be a method of selecting one of three values of (t4−t1), (t7−t4), (t11−t7), for example. Alternatively, a value of N is set as six, and a cycle time can be an average of three time intervals after subtracting a maximum value and a minimum value from five time intervals, for example.

The above calculation process of a cycle time is performed for five IDs of ID=1, ID=2, . . . , ID=5 in FIG. 5B.

Figures 9A, 9B, 9C:
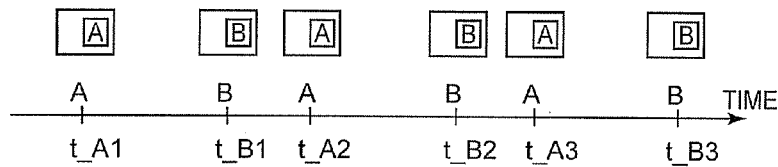
FIG. 9A is a diagram showing reception time of each updated portion according to the first embodiment.
FIG. 9B is a diagram showing an example of a cycle information table and a reception cycle time table according to the first embodiment.
FIG. 9C is a diagram showing an example of an adjusted cycle time table according to the first embodiment.

FIG. 9A shows a state of a screen in which a part of the screen changes repeatedly as A and B, and shows times when the relay device 1 receives these changes. FIG. 9B shows a combination in one table of the cycle information table and the reception cycle time table corresponding to FIG. 9A.

In FIG. 9B, cycle information is obtained by calculating an average value by using reception time information m+1. In calculating the average value, for example, a calculation value can be arranged to change dynamically by storing always only latest received information of four reception times into the reception time information, and by calculating cycle information by using the latest information of four reception times.

[Cycle Converting Unit 15]

The cycle converting unit 15 is explained next. The cycle converting unit 15 adjusts a reception cycle time registered in the reception cycle time table, and thereafter, records an ID number and a cycle time after the adjustment (hereinafter, "adjusted cycle time") into an adjusted cycle time table.

FIG. 9C shows an example of an adjusted cycle time table. The adjusted cycle time table is used to store adjusted cycle times (AT_ID1, AT_ID2, . . . , etc.) for corresponding ID numbers.

A reception cycle time calculated by the cycle detecting unit 14 does not necessarily match a cycle time of a screen of the application server 2. The cycle converting unit 15 explained below does not demonstrate a cycle time in the application server 2, but has a feature in adjusting the cycle time to a suitable cycle time from a viewpoint of process load of the relay device 1 or the client terminal 3. For example, the cycle converting unit 15 adjusts a cycle time by reducing a number of timers managed by the relay device 1 or the client terminal 3, or adjusts the cycle time to prevent a cycle from becoming out of order due to inability of the image process to follow a large amount of screen information. The cycle converting unit 15 adjusts a cycle time by any of the following methods or by combining these methods.

Adjustment Example 1

For example, when a reception cycle time includes a numerical value equal to or less than two decimal places such as 1.13 seconds, 2.41 seconds, and 3.56 seconds, the two or less decimal places are rounded off. As a result, respective adjusted cycle times become 1.1 seconds, 2.4 second, and 3.6 seconds.

Adjustment Example 2

For example, an adjusted cycle time is converted to a value closest to a multiple of 0.2. When reception cycle times are 1.13 seconds, 2.41 seconds, 3.56 seconds, respective adjusted cycle times become 1.2 seconds, 2.4 seconds, 3.6 seconds.

Adjustment Example 3

For example, when a reception cycle time is equal to or less than 0.1 second (such as 0.01 second, 0.09 second), an adjusted cycle time is set to 0.1 second.

Adjustment Example 4

When an updated portion has a size equal to or more than a certain threshold value, an adjusted cycle time is set equal to or more than Z seconds. For example, when Z=2.0 seconds, adjusted cycle times become 2.0 seconds, 2.0 second, and 3.4 seconds respectively for reception cycle times 1.1 seconds, 1.8 seconds, and 3.4 seconds, when an updated portion has a size equal to or more than 640×480 pixels.

Adjustment Example 5

An adjusted cycle time is determined by considering a network zone and quality between the relay device 1 and the client terminal 3. For example, when it is not possible to perform communications at 10 Mbps or at a higher speed between the relay device 1 and the client terminal 3, an adjusted cycle time is set equal to or longer than 1.0 second or more. Adjustment of a cycle time can be also applied to other adjustment example than the above adjustment examples.

The cycle converting unit 15 stores the adjusted cycle time into the adjusted cycle time table for each ID. The cycle converting unit 15 performs the above process for five IDs of ID=1, ID=2, . . . , ID=5 in FIGS. 5B and 8B.

The cycle converting unit 15 notifies a cycle screen presence notice indicating presence of the cycle screen to the screen information transmitting unit 13, when the cycle converting unit 15 stores one adjusted cycle time into the adjusted cycle time table. The cycle converting unit 15 notifies a finish notice to the screen information transmitting unit 13, when a number of adjusted cycle times registered in the adjusted cycle time table becomes 0 as a result of deleting the adjusted cycle time from the adjusted cycle time table.

As explained above, the cycle detecting unit 14 and the cycle converting unit 15 store pixel information that cyclically changes into the cycle screen storage unit 16, and store information concerning a cycle time into the cycle information table, the reception cycle time table, and the adjusted cycle time table of the management table storage unit 17.

The cycle detecting unit 14 can also include a function to periodically confirm whether pixel information is cyclically updated. For example, after calculating a reception cycle time for ID=X, when the cycle detecting unit 14 does not detect update of screen information at two continuous times at the reception cycle time interval of the reception cycle time, the cycle detecting unit 14 deletes entry information of ID=X from the cycle information table and the reception-cycle time table. At the same time, the cycle detecting unit 14 also deletes pixel information corresponding ID=X from the cycle screen storage unit 16. The cycle detecting unit 14 also notifies deletion of the information of ID=X to the cycle calculating unit 15, and deletes the entry information of ID=X from the adjusted cycle time table.

[Screen Information Transmitting Unit 13]

Figure 10:
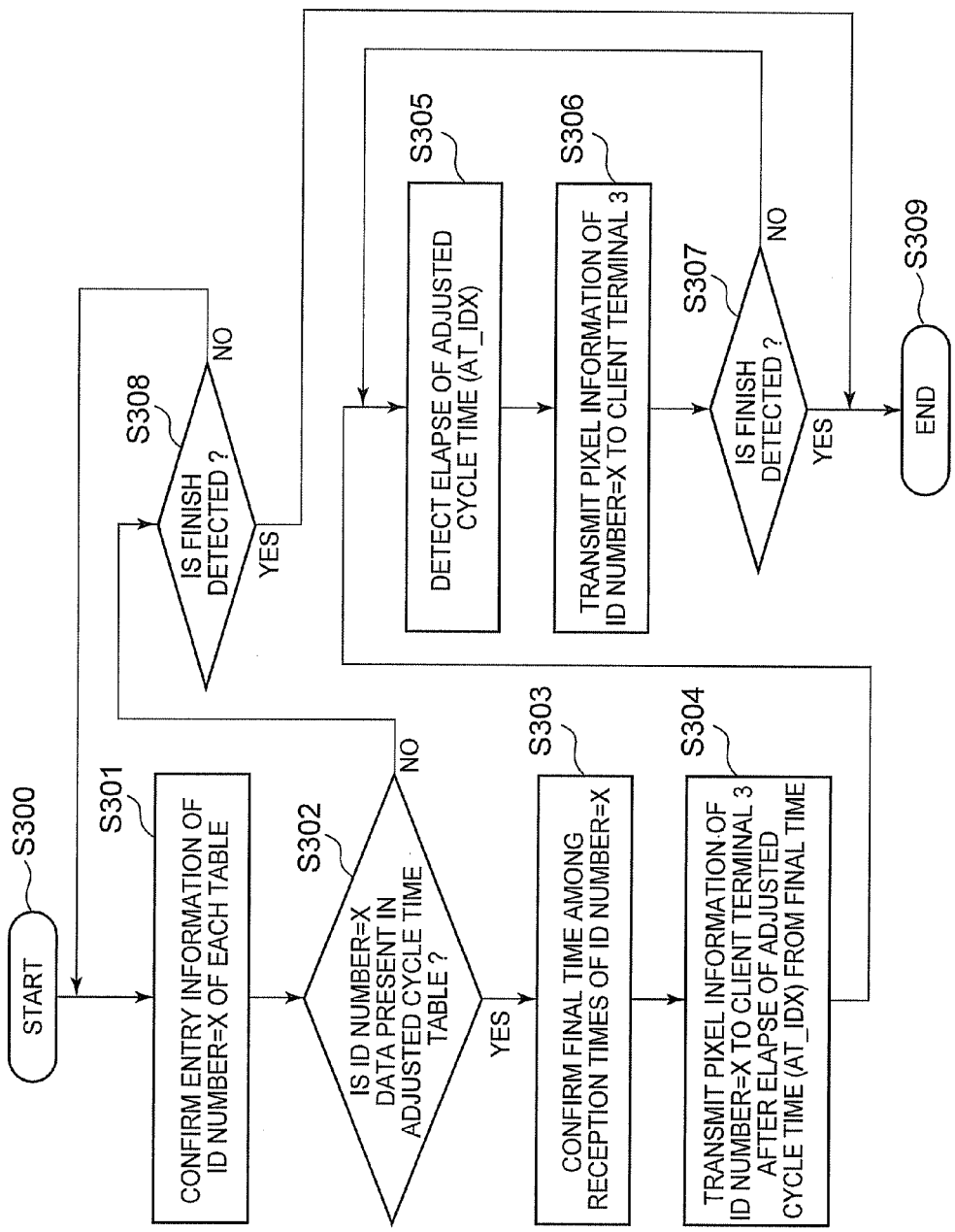
FIG. 10 is a flowchart for explaining a process of a screen information transmitting unit 13 according to the first embodiment.

A process that the screen information transmitting unit 13 cyclically transmits pixel information of a cycle screen stored in the cycle screen storage unit 16 to the client terminal 3 is explained. FIG. 10 shows a flowchart of the process that the screen information transmitting unit 13 cyclically transmits pixel information stored in the cycle screen storage unit 16 to the client terminal 3.

The screen information transmitting unit 13 performs the following process for each update portion (for each ID number), when presence of a cycle screen is notified from the cycle converting unit 15.

First, the screen information transmitting unit 13 refers to the cycle information table, the reception cycle time table, and the adjusted cycle time table, and confirms that the entry information of ID=X is present in each table (Step S301).

When the information of ID=X is present in the adjusted cycle time table (that is, a cycle time is already adjusted) (Yes in Step S302), the screen information transmitting unit 13 further refers to the cycle information table. The screen information transmitting unit 13 confirms time (hereinafter, "final time") when the screen information transmitting unit 13 finally receives an updated portion among reception times of the updated portion of ID=X stored in the cycle information table (Step S303).

The screen information transmitting unit 13 acquires pixel information corresponding to ID=X from the cycle screen storage unit 16 after an adjusted cycle time (AT_IDx) elapses from a confirmed final time. The screen information transmitting unit 13 transmits this pixel information to the client terminal 3 as screen information (Step S304).

Thereafter, the screen information transmitting unit 13 acquires pixel information corresponding to ID=X from the cycle screen storage unit 16 each time when the adjusted cycle time (AT_IDx) elapses (Step S305), and repeats the process of transmitting to the client terminal 3 (Step S306).

When a finish notice is notified from the cycle converting unit 15, the screen information transmitting unit 13 finishes the cyclical transmission of screen information to the client terminal 3 (Step S307 or Step S308). In this case, finish detection can be also determined based on deletion of the entry information of ID=X from the cycle information table, the reception cycle time table, and the adjusted cycle time table, as described above.

The above process is performed for five IDs of ID=1, ID=2, . . . . , ID=5 in each table shown in FIGS. 5B, 8B, 9C, for example.

The relay device 1 transmits screen information to the client terminal 3 following the adjusted cycle time by the above process.

As described above, according to the embodiment, the relay device 1 adjusts a cycle time of updating a screen based on reception time for receiving a cycle screen from the application server 2, and can regularly transmit screen information to the client terminal 3 following the adjusted cycle time.

Consider a case where, in the application server 2, a monitor application that displays a state of an accident or the like is operating, and a position of an accident occurrence is flickering in a cycle of one second on this screen, for example. According to a conventional method, disorder of a cycle of flickers and omission of flickers occur sometimes in the client terminal 3. On the other hand, in the embodiment, disorder and omission of flickers do not occur in the client terminal 3, and the client terminal 3 can display a screen that flickers in a regular cycle.

Detailed numerical displays in the embodiment are an example, and are not limited to these numerical values.

Although an example of using a pull-type screen transfer protocol between the application server 2 and the relay device 1 is explained in the embodiment, the embodiment can be also achieved by using a push-type screen transfer protocol.

Although an example of using a push-type screen transfer protocol between the relay device 1 and the client terminal 3 is explained in the embodiment, the embodiment can be also achieved by using a pull-type screen transfer protocol when the client terminal 3 repeatedly transmits a screen acquisition request.

Second Embodiment

A case where a portion of a screen changes in plural display patterns such as "A", "B", "C" is explained in a second embodiment. Specifically, while the relay device 1 described in the first embodiment independently manages an adjusted cycle time of "A", an adjusted cycle time of "B", and an adjusted cycle time of "C", these cycle times are managed by relating the cycle times to each other in the second embodiment.

The relay device 1 in the present embodiment is similar to that in the first embodiment, except that operation that the cycle converting unit 15 generates an adjusted cycle time table is different from the operation in the first embodiment. Therefore, the operation of the cycle converting unit 15 is mainly explained below.

Figures 11A, 11B:
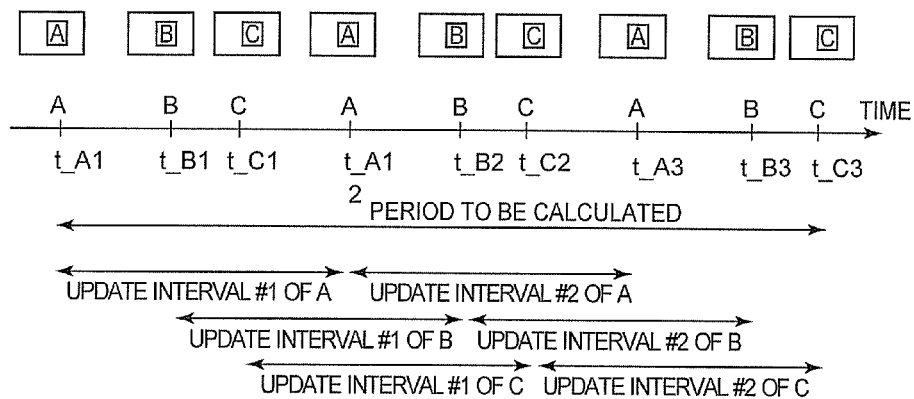
FIG. 11A is an explanatory diagram of a reception time and a cycle time for each updated portion according to a second embodiment of the invention.
FIG. 11B is a diagram showing an example of a cycle information table and a reception cycle time table according to the second embodiment.

FIG. 11A shows a state that a part of a screen changes in the same cycle in three display patterns of "A", "B", "C", and reception times of screen information by the relay device 1. As shown in FIG. 11A, the relay device 1 receives an updated portion "A" at times t_A1, t_A2, t_A3, receives an updated portion "B" at times t_B1, t_B2, t_B3, and receives an updated portion "C" at times t_C1, t_C2, t_C3.

FIG. 11B shows an example of a cycle information table and a reception cycle time table of the case shown in FIG. 11A. First, the cycle detecting unit 14 generates a cycle information table and a reception cycle time table as shown in FIG. 11B by a process similar to that in the first embodiment (FIG. 7). FIG. 11B shows a table that incorporates the cycle information table and the reception cycle time table. In the embodiment, 3 is set to the value of N in Step S201 in the process of the cycle calculation by the cycle detecting unit 14 explained in the first embodiment (FIG. 7). Because the value of N is 3, three data of IDs=1 to 3 are stored in FIG. 11B.

Next, the cycle converting unit 15 generates an adjusted cycle time table by referring to the cycle information table and the reception cycle time table in FIG. 11B. A generation procedure of the adjusted cycle time table is described below.

[Procedure 1]

The cycle converting unit 15 sets data of the same region information as the same group of data, and sets each data discriminated by an ID number as a member, out of data registered in the cycle information table and the reception cycle time table. An identifier that identifies a member of the same group is newly added to the adjusted cycle time table in the embodiment. In the example of FIG. 11B, IDs=1, 2, 3 are in the same group (a first group). New identifiers NewIDs=100, 101, 102 are added in addition to IDs=1, 2, 3, in the adjusted cycle time table shown in FIG. 12A. The NewIDs indicate that these data are in the same group. When other group (a second group) is present for example, NewIDs 200, 201, 202 are added to data of the second group. The second group is discriminated from the first group by numerals of an order of 100.

[Procedure 2]

The cycle converting unit 15 enters an ID number of each data in the cycle information table and the reception cycle time table and a reception start time within a calculation period, in the adjusted cycle time table, for each identifier (NewID). The reception start time is a time when the relay device receives the data for the first time. That is, the reception start time is the earliest time among reception times described for each data in the cycle information table. For example, as shown in FIG. 12A, the cycle converting unit 15 enters 1 as an ID number, and enters t_A1 as a reception start time, in a row of NewID=100.

[Procedure 3]

The cycle converting unit 15 selects a member of which a reception start time is earliest in the same group. In the example of FIG. 12A, NewID=100 is selected.

[Procedure 4]

The cycle converting unit 15 uses a reception cycle time of a member selected in the procedure 3 as an adjusted time of each member that belongs to the same group. The cycle converting unit 15 enters a reception cycle time of selected members as an adjusted cycle time of all members, in the adjusted cycle time table. For example, in the example of FIG. 12A, a reception cycle time T_A of the member of NewID=100 is used as an adjusted cycle time of NewIDs=100, 101, 102.

[Procedure 5]

The cycle converting unit 15 enters offset time of each member that belongs to the same group in the adjusted cycle time table. The offset time is a difference between a reception start time of a member selected in the procedure 3 and a reception start time of other member. For example, as shown in FIG. 12A, the cycle converting unit 15 enters t_A1-t_A1 (=0) as offset time of the NewID=100, and enters t_B1-t_A1 as offset time of the NewID=101.

The adjusted cycle time table as shown in FIG. 12A is generated from the cycle information table and the reception cycle time table in FIG. 11B, by the above procedures.

A process that the screen information transmitting unit 13 cyclically transmits pixel information of a cycle screen stored in the cycle screen storage unit 16 to the client terminal 3 is explained next.

In a certain group, the screen information transmitting unit 13 transmits screen information to the client terminal 3 following the process flow shown in FIG. 10, for a member of which offset time is 0 (NewID=100, in the example of FIG. 12A). The "ID number" described in FIG. 10 is substituted by "NewID".

On the other hand, in a certain group, the screen information transmitting unit 13 "confirms a final reception time corresponding to offset time 0 in the same group, and sets a base time by adding the offset time to the final reception time (Step S303')", instead of the process in Step S303 in FIG. 10, for a member of which offset time is not 0 (NewIDs=101 and 102 in the example of FIG. 12A). The screen information transmitting unit 13 "transmits pixel information of the ID number=X to the client terminal 3 after a cycle time (AT_IDX) adjusted from the base time (Step S304')", instead of the process in Step S304 in FIG. 10. The screen information transmitting unit 13 transmits screen information to the client terminal 3 following the process flow shown in FIG. 10, for other steps.

FIG. 12B shows an adjusted cycle time table generated from the cycle information table in FIG. 5B and the reception cycle time table in FIG. 8B, as an example of the adjusted cycle time table in the embodiment. FIG. 12B shows the adjusted cycle time table generated by the above-described procedures, for a case where two positions of the screen change in three kinds or two kinds of display patterns respectively.

The process in the adjustment example 2 shown in the first embodiment (conversion to a value nearest to a multiple value of 0.2 second) can be performed to the adjusted cycle time of the group of NewIDs=100, 101, 102 and to the adjusted cycle time of the group of NewIDs=200, 201, 202. In this case, a similar process (conversion to a value nearest to a multiple value of 0.2 second) can be also performed to the offset time. Alternatively, the adjusted cycle time and the offset can be set such that timings of transmitting the screen information of NewID=100 and the screen information of NewID=200 (Step S304 of the process flow shown in FIG. 10 for the respective transmissions) match each other. In this way, display patterns that change at plural portions of a screen can be synchronized by adjusting the adjusted cycle times between groups and the offset time within a group, and further by matching transmission timings.

In the first embodiment, when the same portion of the screen changes as "A", "B", "C", for example, the adjusted cycle time of "A", the adjusted cycle time of "B", and the adjusted cycle time of "C" are handled separately. Therefore, there is a possibility that a time interval between "A" and "B", a time interval between "B" and "C", and a time interval between "C" and "A" do not match each other. On the other hand, in the second embodiment, when the same portion of the screen changes as "A", "B", "C", these "A", "B", and "C" are set in a group. Adjusted cycle times of "A", "B", "C" are unified, and the offset time is used. With this arrangement, it is possible to prevent mismatch of time intervals between "A" and "B", between "B" and "C", and between "C" and "A", respectively. That is, according to the embodiment, screen information that changes in plural display patterns at the same portion of the screen can be regularly transmitted to the client terminal 3 in an adjusted cycle.

The invention is not limited to only the above embodiments, and can be achieved by modifying constituent elements within a range not deviating from the gist of the invention at implementation stages. Various inventions can be formed by suitably combining plural constituent elements disclosed in the embodiments. For example, several constituent elements can be deleted from whole constituent elements disclosed in the embodiments. Further, constituent elements in different embodiments can be suitably combined with each other.

What is claimed is:

1. A relay device that relays communications between a server which transmits screen information and a client which receives the screen information, the relay device comprising:

a receiving unit that receives the screen information from the server;

a storage unit that stores the screen information;

a detecting unit that detects a cycle of a change as first cycle information when the screen information cyclically changes, the first cycle information including a time length of a reception interval of same pixel information of same updated portion that is repeatedly received;

a converting unit that converts the first cycle information into second cycle information, the second cycle information, being different from the first cycle information, adjusting an interval for transmitting the screen information; and a transmitting unit that acquires the screen information from the storage unit and transmits the screen information to the client at a timing based on the second cycle information, wherein when the receiving unit receives a plurality of kinds of cyclically-changing screen informing from the server, the storage unit stores the plurality of kinds of screen information, the detecting unit detects the first cycle information for each of the plurality of kinds of screen information, the converting unit converts each of the first cycle information into the second cycle information, and
the transmitting unit acquires corresponding one of the screen information from the storage unit and transmits the screen information to the client at a timing based on the respective second cycle information.

2. The relay device according to claim 1, wherein
the storage unit further stores a time that becomes a base of a transmission start of the screen information, and
the transmitting unit transmits the screen information to the client, when time corresponding to the second cycle information elapses from the time that becomes the base of the transmission start.

3. The relay device according to claim 2, wherein,
the detecting unit compares screen information received by the receiving unit with screen information stored in the storage unit, and overwrites the screen information of the storage unit with the received screen information, when the detecting unit determines that the received screen information and the stored screen information are similar to each other.

4. The relay device according to claim 3, wherein,
the converting unit sets the second cycle information of each of the plurality of kinds of screen information such that the second cycle information is synchronous with each other.

5. A relay method that relays communications between a server which transmits screen information and a client which receives the screen information, the relay device comprising:
receiving the screen information from the server by a receiving unit;
storing the screen information by a storage unit;
detecting a cycle of a change as first cycle information when the screen information cyclically changes, by a detecting unit, the first cycle information including a time length of a reception interval of same pixel information of same updated portion that is repeatedly received;
converting the first cycle information into second cycle information by a converting unit, the second cycle information, being different from the first cycle information, adjusting an interval for transmitting the screen information; and
acquiring the screen information from the storage unit and transmitting the screen information to the client at a timing based on the second cycle information, by a transmitting unit, wherein
when the receiving unit receives a plurality of kinds of cyclically-changing screen informing from the server,
storing the plurality of kinds of screen information by the storage unit,
detecting the first cycle information for each of the plurality of kinds of screen information by the detecting unit,
converting each of the first cycle information into the second cycle information by the converting unit, and
acquiring corresponding one of the screen information from the storage unit and transmitting the screen information to the client at a timing based on the respective second cycle information by the transmitting unit.

6. The relay method according to claim 5, wherein
storing a time that becomes a base of a transmission start of the screen information by the storage unit, and
transmitting the screen information to the client by the transmitting unit, when time corresponding to the second cycle information elapses from the time that becomes the base of the transmission start.

7. The relay method according to claim 6, wherein,
comparing screen information received by the receiving unit with screen information stored in the storage unit, and overwriting the screen information of the storage unit with the received screen information, by the detecting unit, when the detecting unit determines that the received screen information and the stored screen information are similar to each other.

8. The relay method according to claim 7, wherein,
setting the second cycle information of each of the plurality of kinds of screen information such that the second cycle information is synchronous with each other, by the converting unit.

9. A relay system that relays communications comprising:
a server which transmits screen information;
a client which receives the screen information;
a receiving unit that receives the screen information from the server;
a storage unit that stores the screen information;
a detecting unit that detects a cycle of a change as first cycle information when the screen information cyclically changes, the first cycle information including a time length of a reception interval of same pixel information of same updated portion that is repeatedly received;
a converting unit that converts the first cycle information into second cycle information, the second cycle information, being different from the first cycle information, adjusting an interval for transmitting the screen information; and
a transmitting unit that acquires the screen information from the storage unit and transmits the screen information to the client at a timing based on the second cycle information, wherein
when the receiving unit receives a plurality of kinds of cyclically changing screen informing from the server,
the storage unit stores the plurality of kinds of screen information,
the detecting unit detects the first cycle information for each of the plurality of kinds of screen information,
the converting unit converts each or the first cycle information into the second cycle information, and
the transmitting unit acquires corresponding one of the screen information from the storage unit and transmits the screen information to the client at a timing based on the respective second cycle information.

10. The relay device according to claim 1,
wherein the detecting unit detects the update of the screen information,
and when the update is detected, a first update time is stored.

11. The relay device according to claim 10,
wherein a second update time is stored when a part of the updated screen information is the same,
and according to the first update time and the second update time, the first cycle information is determined.

12. The relay device according to claim 11,
wherein when pluralities of the stored update time are more than a predetermined number, the first cycle information is determined based on a calculation method including an average of the reception interval.

13. The relay method according to claim 5,
wherein a step of detecting further detects the update of the screen information,
and when the update is detected, a first update time is stored.

14. The relay device according to claim 13,
wherein a second update time is stored when a part of the updated screen information is the same,
and according to the first update time and the second of the time, the first cycle information is determined.

15. The relay device according to claim 14,
wherein when pluralities of the stored update time of more than a predetermined number, the first cycle information is determined based on a calculation method including an average of the reception interval.

* * * * *